United States Patent
King et al.

(10) Patent No.: US 11,403,634 B2
(45) Date of Patent: Aug. 2, 2022

(54) REAL-TIME INTERACTION BASED ASSISTANCE INTERFACE

(71) Applicant: BANK OF AMERICA CORPORATION, Charlotte, NC (US)

(72) Inventors: Christopher Nicholas King, Charlotte, NC (US); Lauren Marie Bavis, Cornelius, NC (US); Lisa D. Curry, Warwick, RI (US); James Eugene Illing, Charlotte, NC (US); Erin McCullen, Charlotte, NC (US); Anthony Charles Tremble, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 304 days.

(21) Appl. No.: 16/897,647

(22) Filed: Jun. 10, 2020

(65) Prior Publication Data

US 2020/0387770 A1    Dec. 10, 2020

Related U.S. Application Data

(60) Provisional application No. 62/859,448, filed on Jun. 10, 2019.

(51) Int. Cl.
*G06Q 20/40*    (2012.01)
*G06Q 20/08*    (2012.01)
(Continued)

(52) U.S. Cl.
CPC ......... *G06Q 20/40* (2013.01); *G06F 16/2379* (2019.01); *G06F 40/174* (2020.01);
(Continued)

(58) Field of Classification Search
CPC ...... G06Q 20/40; G06Q 10/00; G06Q 20/085; G06Q 30/0185; G06Q 40/02; G06Q 40/06;
(Continued)

(56) References Cited

U.S. PATENT DOCUMENTS 6,704,714 B1    3/2004    O'Leary et al.
6,941,285 B2    9/2005    Sarcanin
(Continued)

FOREIGN PATENT DOCUMENTS

| CN | 104221306 A | 12/2014 |
| KR | 1020090073064 A | 7/2009 |
| WO | 2015152882 A1 | 10/2015 |

*Primary Examiner* — Pierre E Elisca
(74) *Attorney, Agent, or Firm* — Moore & Van Allen PLLC; Nicholas C. Russell

(57) ABSTRACT

Embodiments of the invention are directed to a system, method, or computer program product for a real-time interaction based assistance interface. The real-time interaction based assistance interface including software that allow the user to input commands on the artificial intelligence questionnaire to direct to a processing device to execute instructions for a real-time resource aspiration deployment and aspiration assistance. The system aggregates user data pertaining to resource history and interaction history. Using this data and the artificial intelligence questionnaire, the system provides a real-time interaction based assistance interface with resource aspiration prediction and fulfilling assistance.

20 Claims, 5 Drawing Sheets

(51) Int. Cl.

| | | |
|---|---|---|
| *G06Q 40/02* | (2012.01) | |
| *H04W 12/06* | (2021.01) | |
| *G06F 16/23* | (2019.01) | |
| *G06N 5/02* | (2006.01) | |
| *H04L 9/40* | (2022.01) | |
| *G06N 20/00* | (2019.01) | |
| *G06N 3/00* | (2006.01) | |
| *G06N 5/04* | (2006.01) | |
| *G06F 40/174* | (2020.01) | |
| *G06Q 10/10* | (2012.01) | |
| *G06Q 30/00* | (2012.01) | |
| *G06Q 40/06* | (2012.01) | |
| *H04L 67/10* | (2022.01) | |
| *G06Q 20/10* | (2012.01) | |

(52) U.S. Cl.
CPC ............... *G06N 3/006* (2013.01); *G06N 5/02* (2013.01); *G06N 5/04* (2013.01); *G06N 20/00* (2019.01); *G06Q 10/10* (2013.01); *G06Q 20/085* (2013.01); *G06Q 30/0185* (2013.01); *G06Q 40/02* (2013.01); *G06Q 40/06* (2013.01); *H04L 63/08* (2013.01); *H04L 67/10* (2013.01); *H04W 12/06* (2013.01); *G06Q 20/1085* (2013.01)

(58) Field of Classification Search
CPC ............... G06Q 20/1085; G06Q 20/12; G06F 16/2379; G06F 40/174; G06N 3/006; G06N 5/02; G06N 20/00; H04L 63/08; H04L 67/10; H04W 12/06
USPC .......................................................... 706/11
See application file for complete search history.

(56) References Cited

U.S. PATENT DOCUMENTS

| | | |
|---|---|---|
| 7,917,439 B2 | 3/2011 | Barnes, Jr. |
| 7,949,609 B2 | 5/2011 | Colella |
| 9,208,490 B2 | 12/2015 | Pitroda et al. |
| 9,311,659 B2 | 4/2016 | Fisher |
| 10,067,986 B1 | 9/2018 | Thapliyal et al. |
| 10,068,295 B1 | 9/2018 | Allen |
| 10,102,514 B2 | 10/2018 | Laracey |
| 10,185,936 B2 | 1/2019 | O'Leary et al. |
| 10,311,452 B2 | 6/2019 | Martinez et al. |
| 10,853,791 B1 | 12/2020 | Ellis et al. |
| 10,909,582 B1* | 2/2021 | Brandt ............... G06Q 20/3267 |
| 10,943,308 B1* | 3/2021 | Brandt ................... G10L 17/06 |
| 11,132,652 B2 | 9/2021 | Doyle et al. |
| 2002/0077978 A1 | 6/2002 | O'Leary et al. |
| 2003/0140004 A1 | 7/2003 | O'Leary et al. |
| 2005/0246292 A1 | 11/2005 | Sarcanin |
| 2007/0174206 A1 | 7/2007 | Colella |
| 2009/0198618 A1 | 8/2009 | Chan et al. |
| 2012/0054095 A1 | 3/2012 | Lesandro et al. |
| 2013/0339242 A1 | 12/2013 | Mchugh et al. |
| 2014/0136443 A1 | 5/2014 | Kinsey, II et al. |
| 2015/0067819 A1 | 3/2015 | Shribman et al. |
| 2016/0012465 A1 | 1/2016 | Sharp |
| 2016/0180368 A1 | 6/2016 | Booth |
| 2016/0292737 A1 | 10/2016 | Barnes, Jr. |
| 2017/0099295 A1 | 4/2017 | Ricci |
| 2018/0247486 A1 | 8/2018 | Gupta |
| 2018/0293585 A1 | 10/2018 | Salmon et al. |
| 2018/0365753 A1 | 12/2018 | Fredrich et al. |
| 2019/0213659 A1 | 7/2019 | Shannon et al. |
| 2020/0082387 A1 | 3/2020 | Salama et al. |

\* cited by examiner

REAL-TIME INTERACTION BASED ASSISTANCE INTERFACE

CROSS-REFERENCE TO RELATED APPLICATIONS

This application is a U.S. Non-provisional application claiming priority to U.S. Provisional Patent Application No. 62/859,448, filed Jun. 10, 2019 titled Aggregation of User Data for Automatic Process Execution, the contents of which are hereby incorporated by reference in its entirety.

BACKGROUND

With advancements in machine and product development, more and more machines and products are being implemented by businesses and used by individuals. With the advent of more and more machines and products, users have access to more options for their resource distribution needs.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention are directed to a real-time interaction based assistance interface for real-time goal prediction and user relationship display. The system will aggregate user data pertaining to transaction history and current loans. The user's data and goals can be identified through past user interactions and purchases, life stages, artificial intelligence questionnaires prompting the user to input current goals, and pre-filled user inputs from past banking transactions. Real-time goal prediction can provide users with savings goals, purchasing plans, loan options and the like offered by the banking entity to help users achieve their goals. For example, if a user searches the banking entity website for home mortgage information, the entity can identify that the user is attempting to finance a life goal and can offer loan assistance. Loan assistance may be based on user-entity relationship, including total years a user has been associated with the entity, balance in accounts, responsible user financial practices, history of deposits, etc. The system will identify a user goal, provide a goal prediction interface, and provide goal fulfilling assistance.

Embodiments of the invention are directed to a system, method, and computer program product for goal prediction and relationship-based credit decisions. The ability for an entity to aggregate user data pertaining to purchase history and current loans will allow the entity to support the user in achieving their goals through entity-user relationship based credit support.

Embodiments of the present invention address these and/or other needs by providing an innovative system, method and computer program product for generating and displaying a real-time interaction based assistance interface, the invention comprising: capturing and aggregating user data to generate aggregated user data for the real-time interaction based assistance interface; identifying user channel interactions; identifying, based on the aggregated user data and user channel interactions, user resource aspirations via artificial intelligence learning deployment on the aggregated user data and the channel interactions in combination with an artificial intelligent questionnaire presented via the real-time interaction based assistance interface to a user interface for user input; confirming user interaction status and duration with entity providing the real-time interaction based assistance interface; and directing a processing device of a user device to execute instructions to display the real-time interaction based assistance interface.

In some embodiments, capturing and aggregating user data to generate aggregated user data for the real-time interaction based assistance interface further comprises deployment to the real-time interaction based assistance interface an artificial intelligence questionnaire for user input.

In some embodiments, the real-time interaction based assistance interface further comprises software that allow the user to input commands on the artificial intelligence questionnaire to direct to a processing device to execute instructions, wherein the real-time interaction based assistance interface further comprises a graphical user interface (GUI) that direct a processing device of the user device to carry out specific functions.

In some embodiments, the real-time interaction based assistance interface displays on the user device to provide resource aspiration fulfillment assistance products and services for fulfillment of the resource aspiration.

In some embodiments, user resource aspirations comprise goals for user resource deployment.

In some embodiments, the real-time interaction based assistance interface provides the user with savings goals, purchasing plans, loan options offered by the entity to reach the resource aspirations for user resource deployment.

In some embodiments, capturing and aggregating user data to generate aggregated user data for the real-time interaction based assistance interface further comprises capturing channel browsing.

In some embodiments, capturing and aggregating user data to generate aggregated user data for the real-time interaction based assistance interface further comprises identifying historical resource interactions of the user.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
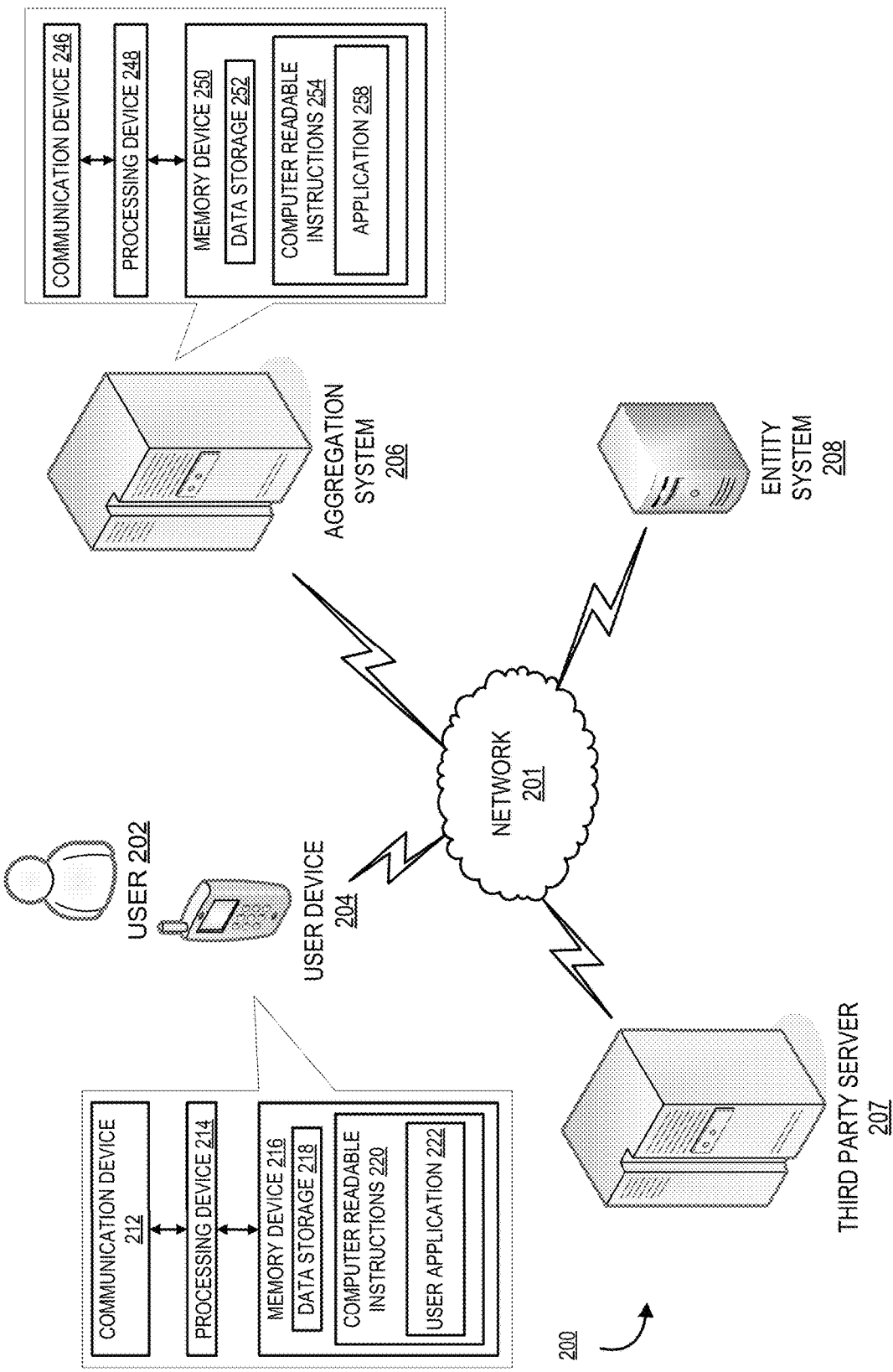
Figure 2:
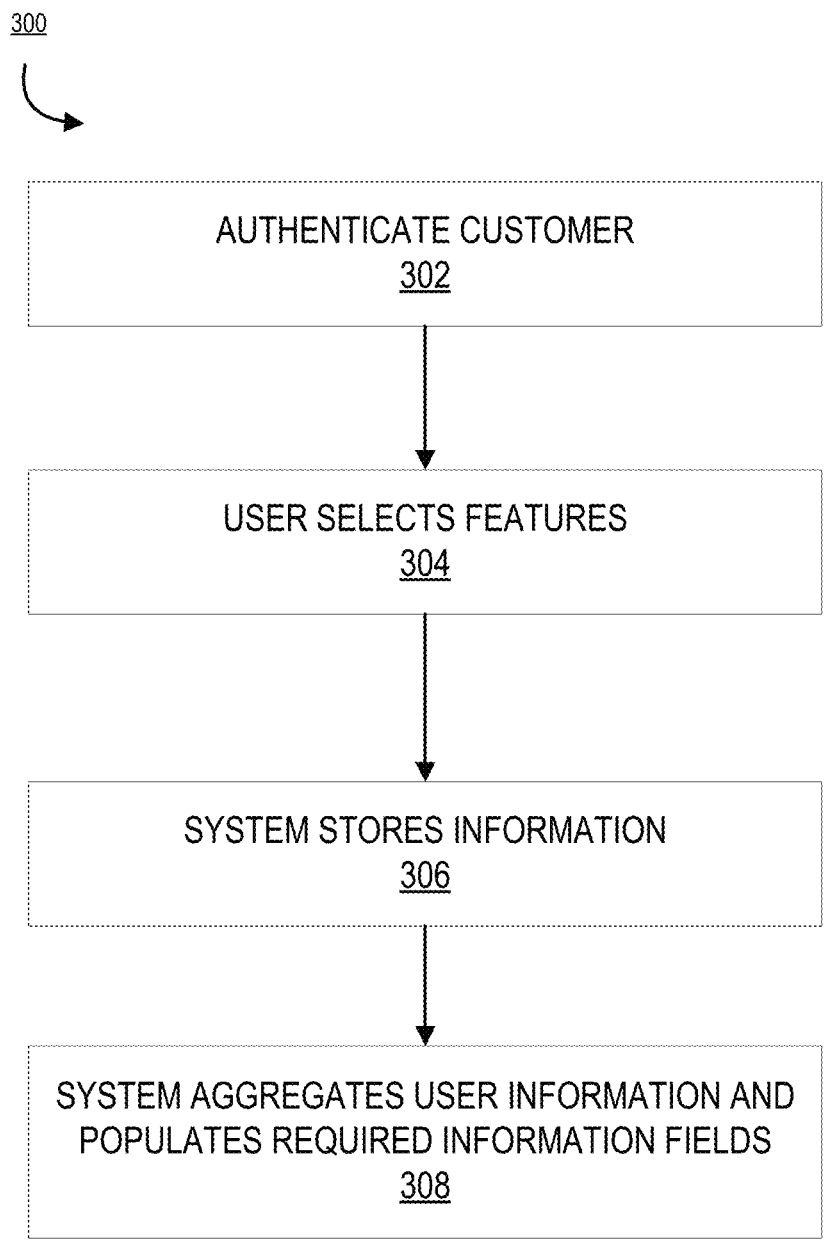
Figure 3:
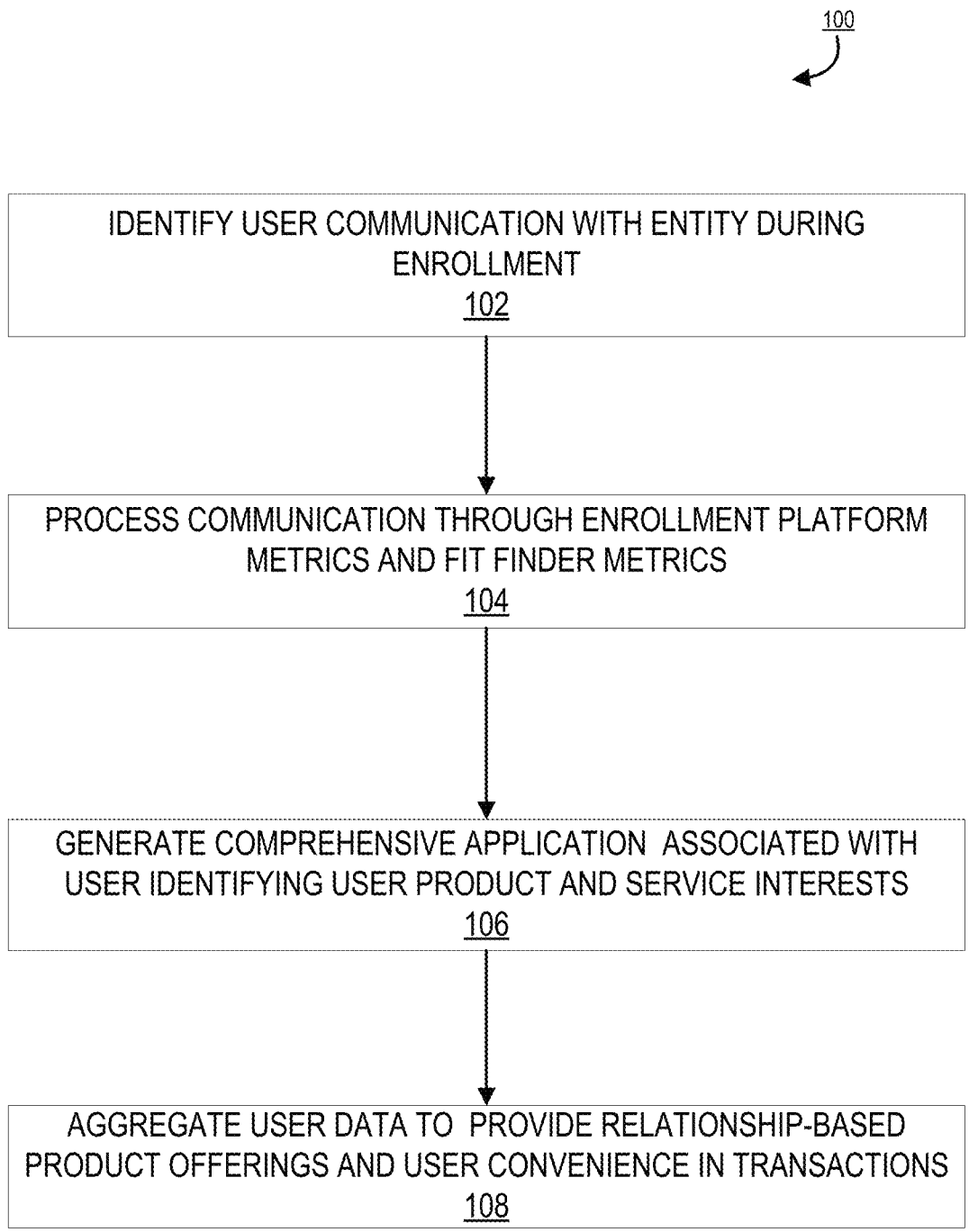
Figure 4:
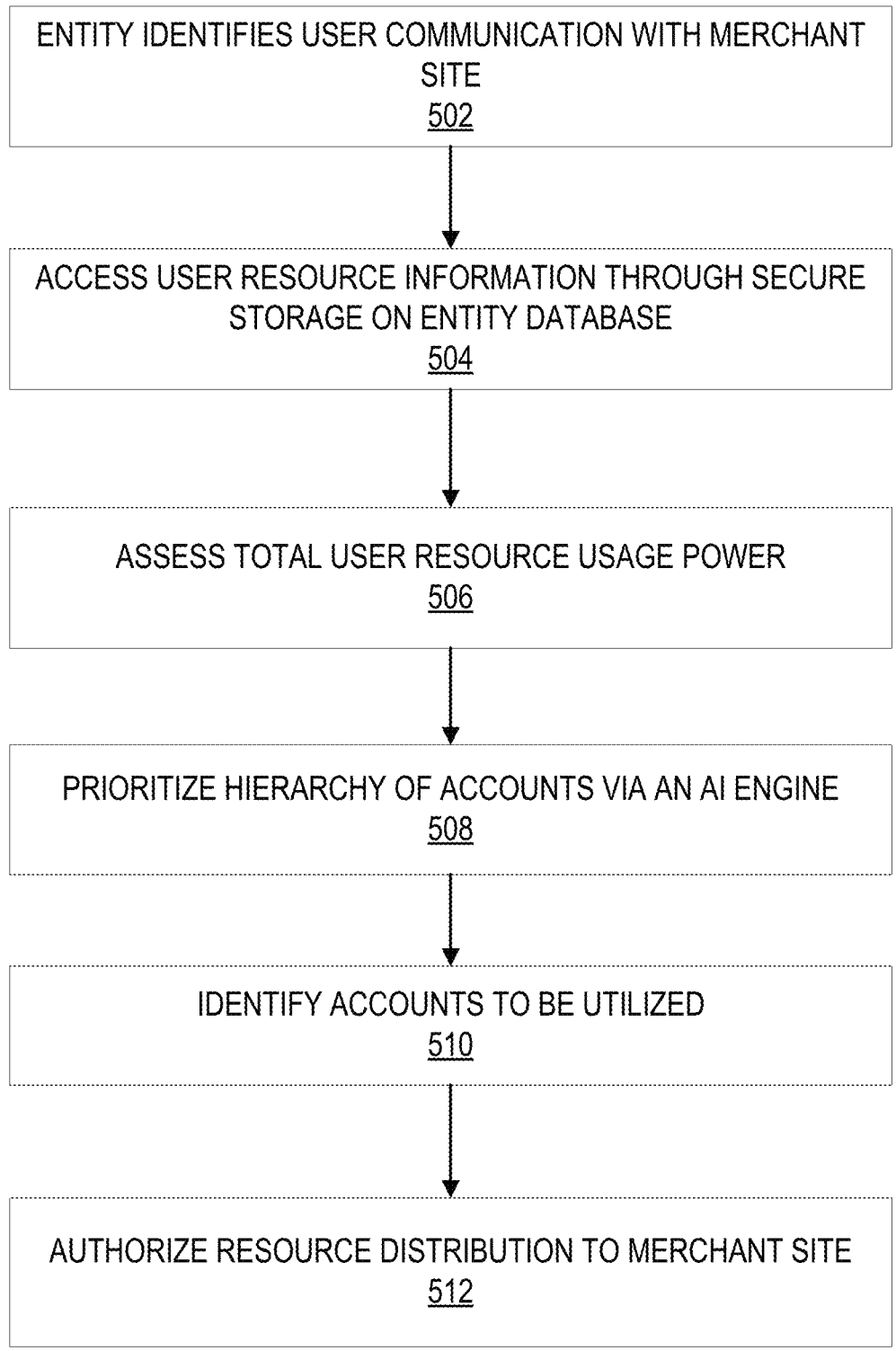
Figure 5:
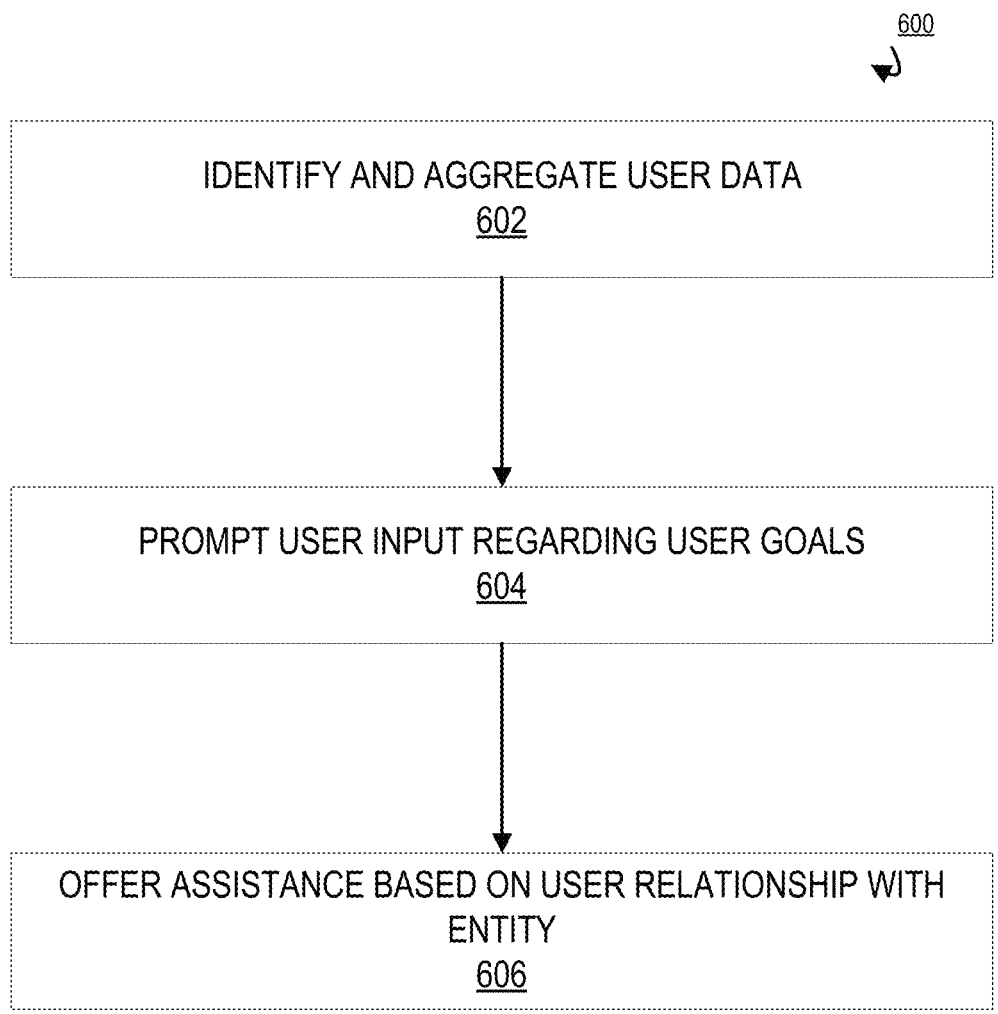

Having thus described embodiments of the invention in general terms, reference will now be made to the accompanying drawings, wherein:

FIG. 1 provides an aggregation for user data for automatic processing execution system environment, in accordance with one embodiment of the present invention;

FIG. 2 provides a communication linkage generation process, in accordance with one embodiment of the present invention;

FIG. 3 provides a high level process map illustrating enrollment in banking services and user fit finding settings for user convenience, in accordance with one embodiment of the present invention;

FIG. 4 provides a high level process flow illustrating single portal pay and secure card purchases, in accordance with one embodiment of the present invention; and FIG. 5 provides a high level process flow illustrating real-time goal prediction and user relationship based credit decisions, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "user" as used herein may refer to any entity or individual associated with a business. In some embodiments, the user may be the business. In some embodiments, the user may be an individual associated with the business. In some embodiments, identities of an individual may include online handles, usernames, aliases, family names, maiden names, nicknames, or the like. Furthermore, as used herein the term "user device" or "mobile device" may refer to mobile phones, personal computing devices, tablet computers, wearable devices, and/or any portable electronic device capable of receiving and/or storing data therein associated with the business.

As used herein, a "user interface" generally includes a plurality of interface devices and/or software that allow a user to input commands and data to direct the processing device to execute instructions. For example, the user interface may include a graphical user interface (GUI) or an interface to input computer-executable instructions that direct the processing device to carry out specific functions. Input and output devices may include a display, mouse, keyboard, button, touchpad, touch screen, microphone, speaker, LED, light, joystick, switch, buzzer, bell, and/or other user input/output device for communicating with one or more users.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

Embodiments of the invention are directed to a system, method, or computer program product for a real-time interaction based assistance interface. The real-time interaction based assistance interface including software that allow the user to input commands on the artificial intelligence questionnaire to direct to a processing device to execute instructions for a real-time resource aspiration deployment and aspiration assistance. The system aggregates user data pertaining to resource history and interaction history. Using this data and the artificial intelligence questionnaire, the system provides a real-time interaction based assistance interface with resource aspiration prediction and fulfilling assistance.

FIG. 1 illustrates an aggregation of user data for automatic processing system environment 200, in accordance with one embodiment of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of digital onboarding across platforms, intelligent search engine text modification, and real-time resource distribution and cross channel application processing.

As illustrated in FIG. 1, the entity system 208 is operatively coupled, via a network 201 to the user device 204, third party servers 207, and to the aggregation system 206. In this way, the entity system 208 can send information to and receive information from the user device 204, third party servers 207, and the aggregation system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has one or more user devices 204 and is in communication with an entity. A user, as described herein may be an individual or business interacting with the system, such as an individual with an account maintained by the entity associated with the system. In this way, a user can communicate with an entity via one of various communication channels, such as in person, on the phone, over the internet, text, or the like. The user may be a current customer of the entity or may be a new customer of the entity. The user may be being enrolled in a product or service provided by the entity. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the aggregation system 206, the entity system 208, and the third party sever 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the aggregation system 206.

As further illustrated in FIG. 1, the aggregation system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the entity system 208, the third party server 207, and the user device 204. As such, the communication device 246 generally comprises a modem, server, or other device for communicating with other devices on the network 201.

As further illustrated in FIG. 1, the aggregation system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the aggregation system 206 the memory device 250 stores an application 258. In one embodiment of the invention, the application 258 may associate with applications having computer-executable program code that generate and code a tag for implementation onto a product. Furthermore, the aggregation system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more entity system 208, third party servers 207, and/or user device 204.

In the embodiment illustrated in FIG. 1 and described throughout much of this specification, the application 258 may generate and display a dashboard on the user device 204 via a communication channel through the network 201. The communication channel may be closed and secure, such that the application 258 may present sensitive user or business information about resources and the like to the user device 204.

As illustrated in FIG. 1, the third party server 207 is connected to the entity system 208, user device 204, and aggregation system 206. The third party server 207 has the same or similar components as described above with respect to the user device 204 and the aggregation system 206. While only one third party server 207 is illustrated in FIG. 1, it is understood that multiple third party servers 207 may make up the system environment 200. The third party server 207 may be associated with one or more third party entities, third party financial institutions, or the like.

As illustrated in FIG. 1, the entity system 208 is connected to the third party server 207, user device 204, and aggregation system 206. The entity system 208 may be associated with the aggregation system 206 providing entity. In this way, the entity system may be a financial institution entity system or the like. The entity system 208 has the same or similar components as described above with respect to the user device 204 and the aggregation system 206. While only one entity system 208 is illustrated in FIG. 1, it is understood that multiple entity system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The entity system 208 may generally include a processing device communicably coupled to devices as a memory device, output devices, input devices, a network interface, a power source, one or more chips, and the like. The entity system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the entity system 208 described herein.

FIG. 2 provides a communication linkage generation process 300, in accordance with one embodiment of the present invention. As illustrated in block 302, the process 300 is initiated by an entity authenticating a user during the user enrollment process. Authentication of a user can occur via the user answering security questions, fingerprint authentication, or the like. In this way, a user can communicate with an entity via one of various communication channels, such as in person, on the phone, over the internet, text, or the like. The user may be a current user of the entity or may be a new user of the entity. The user may be being enrolled in a product or service provided by the entity.

As illustrated in block 304, the process 300 continues by processing user selected features for enrollment of products or services provided by the entity. The user can select features for enrollment via one of various communication channels, such as in person, on the phone, over the internet, text, or the like. In this way, the system may identify the communications of the user and store the communications as preferred preferences and features. The communications may be analyzed in order to identify one or more products or services the user may be interested in. These may be products or services ancillary to the current product the user is being enrolled. The products or services may be based on the current products of the user or based on comments the user communicates during the communication.

As illustrated in block 306, the process 300 continues by storing the information in the entity database. The storage of this information may correspond to products and services of the entity that the user may be interested in based on communication for future needs and enrollment.

As illustrated in block 308, the process 300 is finalized by aggregating user information provided to the entity and populating required information fields based on user communications. Information fields may be first name and last name fields, address fields, date of birth fields, annual resource fields and the like. Aggregation occurs through a process by which the system searches for the user's name on the entity's database of users and pulls information pertaining to that user's prior applications from the entity. The system then populates required information fields for the user for ease of use.

FIG. 3 provides a high level process map illustrating enrollment in banking services and user fit finding settings for user convenience 100, in accordance with one embodiment of the present invention. User enrollment in products offered by the entity and customized user fit finding can assist users in time management and monetary portfolio building. With more machines and products being implemented by businesses and entities, enrollment and comprehensive applications can make users aware of the ability to have access to these product offerings.

As illustrated in block 102, the process 100 is initiated by identifying a user communication with an entity during an enrollment process. In this way, a user may be communication with an entity via one of various communication channels, such as in person, on the phone, over the internet, text, or the like. The user may be a current user of the entity or may be a new user of the entity. The user may be being on boarded for a product or service provided by the entity.

As illustrated in block 104, the process continues by processing the communications through the enrollment platform and performing aggregation and user fit finding metrics on the communications. In this way, the system may identify the communications and preferences of the user and store the communications and preferences. The communications and preferences may be analyzed in order to identify one or more products or services the user may be interested in. These may be products or services ancillary to the current product the user is being enrolled. The products or services may be based on the current products of the user or based on comments the user communicates during the communication and metrics of the user fit finder.

In some embodiments, the user fit finder comprises a survey, questionnaire, or the like with questions the user can respond to in order for the entity to determine user's preferred preferences and settings. These preferences and settings may be automatic transfer of funds from checking account to savings account, weekly reports on account balances, automatic enrollment in a resource transfer programs, and the like.

For example, a user may be at a financial institution attempting to open an account. During the communications, the user will input personal data through a comprehensive application. The system may identify that and provide the user with products and accounts associated with the user's specific needs.

As illustrated in block 106, the process 100 continues by generating a comprehensive application associated with user identifying user products and services based on user preference. The comprehensive application may contain an application to open a checking or savings account with the entity, a loan application, a mortgage application, or the like. The comprehensive application may be sectioned off in order to allow user freedom in selecting preferred enrollment for products and services.

As illustrated in block 108, the process 100 is finalized by aggregating user data to provide relationship-based product offerings and user convenience in carrying out transactions. The entity can provide the user with the option to opt in for closely related product offerings and upon user acceptance, entity will automatically upload aggregated user data to the specific application in question.

For example, a user may be at a financial institution attempting to open a checking account. As a result of aggregating user data, the entity may offer the user a savings account in which the aggregated user data would automatically be uploaded to the application. A user may be attempting to take out a mortgage. The entity may offer a mortgage payback plan and upload aggregated user data to that application.

FIG. 4 provides a high level process flow illustrating single portal pay and secure card purchases 500, in accordance with one embodiment of the present invention. With the implementation of more and more machines and products by businesses, and data security becomes more and more important. Single portal pay and secure card control capabilities enable users to enter the marketplace with confidence that their private data is secure. The entity can examine an aggregation of available user funds, present this data to users prior to making a purchase, and allow users to make informed decisions about their purchasing power.

As illustrated in block 502, the process 500 is initiated by the entity identifying a user communication with a merchant site. When the user is at the payment portion of the transaction with the merchant site, the user can communicate with the entity through one of various communication channels, such as in person, on the phone, over the internet, text, or the like. The entity receives this notification by the user and identifies the merchant site from a database of trusted and secure business partners.

As illustrated in block 504, upon an indication that the merchant site is associated with the entity, the system may trigger user resource distribution for merchant offerings. These offerings may be products, services, plans, or the like that the merchant may provide to the user. User payment information will be stored on a secure database provided via the entity and user data will be shielded from the merchant site.

Next, as illustrated in block 506, the process 500 continues by assessing the total resource distribution power associated with the user. Resource distribution power may include purchasing power may include checking account, savings account, credit card accounts, mortgages, loans and the like that the user may withdraw from for purchases. As such, the platform may be able to identify accounts to utilize for payment to the merchant site in order to provide a more tailored and streamline payment solution for the user.

As illustrated in block 508, the process 500 continues by prioritizing a hierarchy of accounts via an artificial intelligence engine associated with the platform. Hierarchy of accounts will indicate which accounts are best suited to pay for the purchase at the merchant site and indicate which accounts should not be used to pay for the purchase. The artificial intelligence engine may examine aspects of total purchasing power and individual user accounts. As illustrated in block 510, the artificial intelligence engine may identify accounts for the user to withdraw from for payment to merchant sites.

Finally, as illustrated in block 512, the process 500 is finalized by providing the user with account options based on the hierarchy identified and allowing user authorization for the entity to submit secure resource distribution to the merchant site.

FIG. 5 provides a high level process flow illustrating real-time goal prediction and user relationship based credit decisions 600, in accordance with one embodiment of the present invention. The ability for an entity to aggregate user data pertaining to purchase history and current loans will allow the entity to support the user in achieving their goals through entity-user relationship based credit support.

As illustrated in block 602, the process 600 is initiated by identifying and storing aggregated user data. User data and goals can be inferred from pre-filled user inputs, past user behavior and purchases, user life stages, and can be triggered via artificial intelligence questionnaires, as illustrated in block 604. User data and goals can be prompted via one of various communication channels, such as in person, on the phone, over the internet, text, or the like using a survey or questionnaire. Real-time goal prediction for users can provide users with savings goals, purchasing plans, loan options, or the like to help users achieve their goals with help from the entity.

Finally, as illustrated in block 606, the process 600 may identify a user attempting to finance a life goal and offer loan assistance. Loan assistance may be based on user relationship to the entity. User relationship data may include the total years a user has been associated with the entity, user balance in accounts, and responsible user financial practices, such as consistent history of deposits. As such, the system provides a goal prediction interface and goal fulfilling assistance.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating and displaying a real-time interaction based assistance interface, the system comprising:
    a memory device with computer-readable program code stored thereon;
    a communication device, wherein the communication device is configured to establish operative communication with a plurality of networked devices via a communication network;
    a resource interaction processing device operatively coupled to the memory device, and the communication device, wherein the processing device is configured to execute the computer-readable program code to:
        capture and aggregate user data to generate aggregated user data for the real-time interaction based assistance interface;
        identify user channel interactions;
        identify, based on the aggregated user data and user channel interactions, user resource aspirations via artificial intelligence learning deployment on the aggregated user data and the channel interactions in combination with an artificial intelligent questionnaire presented via the real-time interaction based assistance interface to a user interface for user input;
        confirm user interaction status and duration with entity providing the real-time interaction based assistance interface; and
        direct a processing device of a user device to execute instructions to display the real-time interaction based assistance interface.

2. The system of claim 1, wherein capturing and aggregating user data to generate aggregated user data for the real-time interaction based assistance interface further comprises deployment to the real-time interaction based assistance interface an artificial intelligence questionnaire for user input.

3. The system of claim 1, wherein the real-time interaction based assistance interface further comprises software that allow the user to input commands on the artificial intelligence questionnaire to direct to a processing device to execute instructions, wherein the real-time interaction based assistance interface further comprises a graphical user interface (GUI) that direct a processing device of the user device to carry out specific functions.

4. The system of claim 1, wherein the real-time interaction based assistance interface displays on the user device to provide resource aspiration fulfillment assistance products and services for fulfillment of the resource aspiration.

5. The system of claim 1, wherein user resource aspirations comprise goals for user resource deployment.

6. The system of claim 1, wherein the real-time interaction based assistance interface provides the user with savings goals, purchasing plans, loan options offered by the entity to reach the resource aspirations for user resource deployment.

7. The system of claim 1, wherein capturing and aggregating user data to generate aggregated user data for the real-time interaction based assistance interface further comprises capturing channel browsing.

8. The system of claim 1, wherein capturing and aggregating user data to generate aggregated user data for the real-time interaction based assistance interface further comprises identifying historical resource interactions of the user.

9. A computer program product for generating and displaying a real-time interaction based assistance interface, the computer program product comprising at least one non-transitory computer-readable medium having computer-readable program code portions embodied therein, the computer-readable program code portions comprising:
    an executable portion configured for capturing and aggregating user data to generate aggregated user data for the real-time interaction based assistance interface;
    an executable portion configured for identifying user channel interactions;
    an executable portion configured for identifying, based on the aggregated user data and user channel interactions, user resource aspirations via artificial intelligence learning deployment on the aggregated user data and the channel interactions in combination with an artificial intelligent questionnaire presented via the real-time interaction based assistance interface to a user interface for user input;
    an executable portion configured for confirming user interaction status and duration with entity providing the real-time interaction based assistance interface; and
    an executable portion configured for directing a processing device of a user device to execute instructions to display the real-time interaction based assistance interface.

10. The computer program product of claim 9, wherein capturing and aggregating user data to generate aggregated user data for the real-time interaction based assistance interface further comprises deployment to the real-time interaction based assistance interface an artificial intelligence questionnaire for user input.

11. The computer program product of claim 9, wherein the real-time interaction based assistance interface further comprises software that allow the user to input commands on the artificial intelligence questionnaire to direct to a processing device to execute instructions, wherein the real-time interaction based assistance interface further comprises a graphical user interface (GUI) that direct a processing device of the user device to carry out specific functions.

12. The computer program product of claim 9, wherein the real-time interaction based assistance interface displays on the user device to provide resource aspiration fulfillment assistance products and services for fulfillment of the resource aspiration.

13. The computer program product of claim 9, wherein capturing and aggregating user data to generate aggregated user data for the real-time interaction based assistance interface further comprises capturing channel browsing.

14. The computer program product of claim 9, wherein capturing and aggregating user data to generate aggregated user data for the real-time interaction based assistance interface further comprises identifying historical resource interactions of the user.

15. A computer-implemented method for generating and displaying a real-time interaction based assistance interface, the method comprising:

provided a computing system comprising a computer processing device and a non-transitory computer readable medium, where the computer readable medium comprises configured computer program instruction code, such that when said instruction code is operated by said computer processing device, said computer processing device performs the following operations:

capturing and aggregating user data to generate aggregated user data for the real-time interaction based assistance interface;

identifying user channel interactions;

identifying, based on the aggregated user data and user channel interactions, user resource aspirations via artificial intelligence learning deployment on the aggregated user data and the channel interactions in combination with an artificial intelligent questionnaire presented via the real-time interaction based assistance interface to a user interface for user input;

confirming user interaction status and duration with entity providing the real-time interaction based assistance interface; and directing a processing device of a user device to execute instructions to display the real-time interaction based assistance interface.

16. The computer-implemented method of claim 15, wherein capturing and aggregating user data to generate aggregated user data for the real-time interaction based assistance interface further comprises deployment to the real-time interaction based assistance interface an artificial intelligence questionnaire for user input.

17. The computer-implemented method of claim 15, wherein the real-time interaction based assistance interface further comprises software that allow the user to input commands on the artificial intelligence questionnaire to direct to a processing device to execute instructions, wherein the real-time interaction based assistance interface further comprises a graphical user interface (GUI) that direct a processing device of the user device to carry out specific functions.

18. The computer-implemented method of claim 15, wherein the real-time interaction based assistance interface displays on the user device to provide resource aspiration fulfillment assistance products and services for fulfillment of the resource aspiration.

19. The computer-implemented method of claim 15, wherein capturing and aggregating user data to generate aggregated user data for the real-time interaction based assistance interface further comprises capturing channel browsing.

20. The computer-implemented method of claim 15, wherein capturing and aggregating user data to generate aggregated user data for the real-time interaction based assistance interface further comprises identifying historical resource interactions of the user.

* * * * *